June 14, 1938. R. S. TAYLOR ET AL 2,120,379
INNER TUBE
Original Filed Nov. 16, 1932
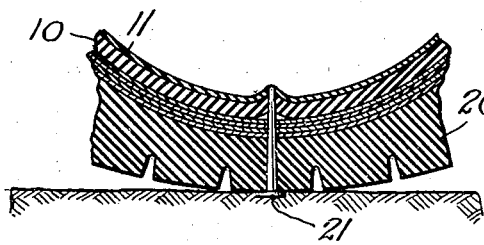
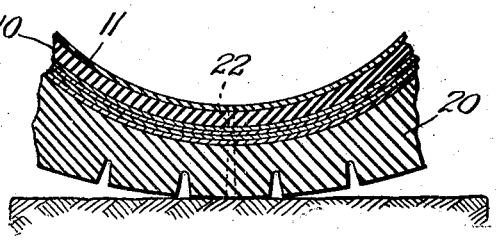
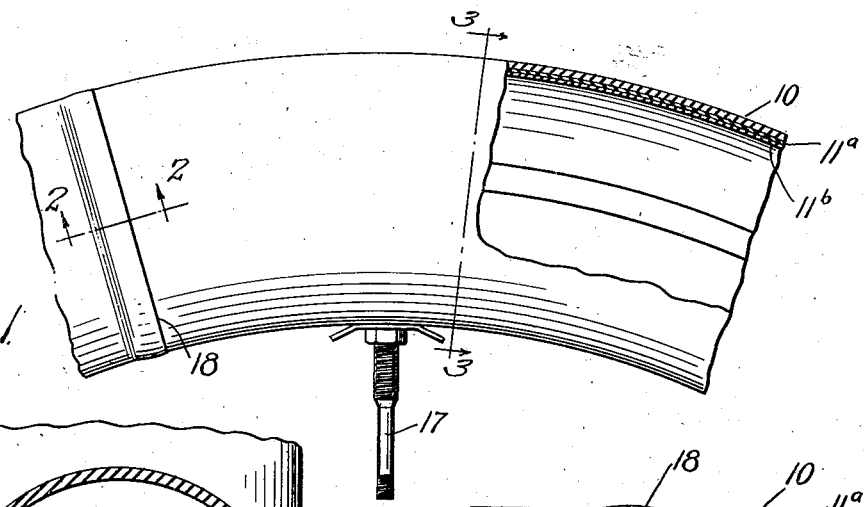
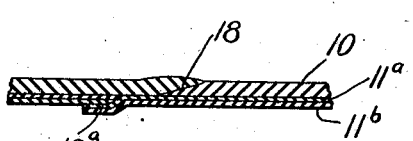
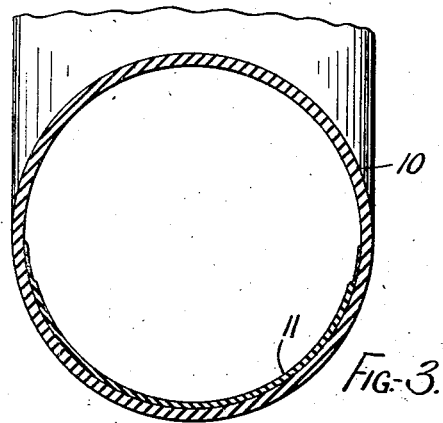
Inventor
RAYMOND S. TAYLOR
PHILIP M. TORRANCE
ROBERT H. ANDERSON
Attorneys Patented June 14, 1938

2,120,379

UNITED STATES PATENT OFFICE 2,120,379

INNER TUBE

Raymond S. Taylor, Philip M. Torrance and Robert H. Andersen, Akron, Ohio, assignors to The Firestone Tire & Rubber Company, Akron, Ohio, a corporation of Ohio Original application November 16, 1932, Serial No. 642,834. Divided and this application May 18, 1934, Serial No. 726,316

4 Claims. (Cl. 152—347)

This invention relates to inner tubes, and more especially it relates to puncture-proof inner tubes for pneumatic tires or other inflatable bodies.

The improved inner tube is of the type that comprises puncture-sealing composition in its structure as distinguished from the compression type of puncture-closing tube, and the chief objects of the invention are to provide a puncture-proof inner tube having improved puncture-sealing composition incorporated in its structure; to reduce the weight of tubes of the character mentioned; to provide improved puncture-sealing properties in the tube; and to provide an improved method of making the tube that will result in economy and facility of manufacture, and reduce the cost of the tube.

A salient feature of the inner tube of the invention is the elimination of the inner layer of vulcanized rubber or other material covering the plastic puncture-sealing compound. An important advantage of the novel method devised is the utilization of a sealing layer which is not excessively tacky or plastic during the manufacturing and assembling stages, but which acquires these characteristics upon being subjected to heat at vulcanizing temperatures, as contrasted with the prior art methods in which the puncture-sealing layer is very tacky during the entire manufacturing process.

This application is a division of our copending application Serial No. 642,834 filed November 16, 1932.

Of the accompanying drawing:

Figure 1 is a fragmentary side elevation of the fabricated inner tube, a part thereof being broken away and in section;

Figure 2 is a section on the line 2—2 of Figure 1;

Figure 3 is a fragmentary transverse section on the line 3—3 of Figure 1;

Figure 4 is a fragmentary detail section of the tread of a pneumatic tire having the improved inner tube therein, showing the action of the tube constituents when pierced by a nail or the like; and Figure 5 is a view similar to Figure 4 showing the action of the tube as the nail is withdrawn.

Referring to the drawing, particularly Figure 3 thereof, it will be seen that the improved inner tubes comprises an annular, tubular structure 10 of the usual elastic vulcanized rubber composition, and a layer 11 of sticky, unvulcanized plastic rubber composition on the inside of the tube so disposed as to cover substantially the outer peripheral half of the tube.

The sticky layer 11 is composed of rubber composition that has been softened and made plastic by a chemical agent in the presence of heat during the vulcanizing of the tube proper. Before being heated the composition has the same physical characteristics as ordinarily unvulcanized rubber composition, being semi-plastic and only slightly tacky, and easily worked. Thus it is a simple matter to incorporate the layer 11 in the tube structure during the fabrication thereof.

The following formula for the layer 11 has been found to give satisfactory results.

|                  | Per cent |
|------------------|----------|
| Phosphoric acid  | 2        |
| Clay             | 1¾       |
| Rosin oil        | 3        |
| Rubber           | 93¼      |

The particular softening chemical agent used is ortho phosphoric acid $(H_3PO_4)_2.H_2O$ of 85% strength. The clay serves as a vehicle for the phosphoric acid, the clay and acid being mixed together before being added to the other ingredients.

The rosin oil serves as a softener and tack producer, and its use here is typical of many rubber compounds. The several ingredients are mixed on a rubber mill in the usual manner, the mixture having the physical characteristics of normal compounded rubber stock. It may be calendered into sheets and slit into strips for use in building inner tubes.

In the structure shown in Figure 1 the layer 11 covers the outer peripheral half of the body structure, which is the tread portion of the tube. Preferably the layer 11 consists of two plies of the non-vulcanizing stock, as is shown at 11ª, 11ᵇ, Figures 1 and 2. A non-tacky plastic layer is provided on the tube as by coating with a thin film of lacquer, paint, varnish, plasticized gelatin or glue, or cotton flock. This layer prevents the walls from adhering to each other during the finishing processes and during the packing, shipping and use of the tube. A suitable valve stem 17 is mounted in the tube.

The application of heat to the tube results in the vulcanization of the body structure 10, but the layer 11, due to the presence of the chemical agent and absence of sulphur, accelerator or other vulcanizing ingredients in its composition, does not vulcanize. On the contrary the layer 11 becomes extremely plastic, almost viscous in form, and interiorly is very sticky. Although the non-tacky layer in the tube causes the surface of layer 11 to be somewhat less sticky so that it will not adhere to the opposite wall of the tube should it come in contact therewith, it is preferable that the finished tube be kept in lightly inflated condition.

The action of the tube in service is illustrated in Figures 4 and 5 wherein 20 designates the tread portion of a pneumatic tire casing within which the tube is mounted, and 21 designates a nail or tack that has penetrated the tire tread and tube, thus passing through the sticky layer 11 of the latter. The sticky stock 11 adheres to nail 21 so that when the nail is withdrawn it draws some of the stock 11 with it so as completely to seal the hole through the body structure 18, as shown at 22, Figure 5, and thus effectively to prevent the escape of air from the inner tube. This sealing action is greatly superior to that of a puncture-sealing inner tube in which an internal layer of vulcanized rubber covers the plastic layer. In the latter instance the vulcanized rubber, being elastic, yieldingly grips the nail that punctures it, with the result that it follows the nail as the latter is withdrawn from the hole, and thus prevents the plastic composition from filling the hole. The thin film of relatively non-tacky material coated on the interior of the tube as described above is relatively non-elastic and does not follow the nail so as to interfere with the effective sealing puncture.

The layer 11 retains its sticky character for an indefinite period and provides a positive seal against puncture of the tube. The tube is less costly, lighter in weight, and provides easier riding than puncture-sealing tubes of the compression type. The tube may be manufactured with but slight departure from the usual tube-manufacturing methods, and the invention achieves the other advantages set out in the foregoing statement of objects.

In addition to ortho-phosphoric acid it has been found that many other chemical agents also have the power to cause the rubber to become permanently tacky and plastic upon being subjected to heat at vulcanizing temperatures and may therefore be used in compounding layer 11. The following is a representative list of these agents:

Sulphuric acid
Chromic acid
Phosphorus pentoxide
Phthalic anhydride
Potassium permanganate
Meta-phosphoric acid
Phosphorus acid
Boric acid
Lead peroxide
Di-sodium phosphate
Stannous chloride
Furoic acid
Para toluene sulphonic acid
Chloro sulphonic acid
Mono-sodium phosphate
Arsenic acid
Copper sulphate Other modifications may be resorted to without departing from the spirit of the invention or the scope of the appended claims, which are not limited wholly to the specific construction shown or exact procedure described.

What is claimed is:

1. An inner tube comprising an annular tubular structure of elastic rubber composition, and a layer of non-elastic, sticky rubber composition on the interior wall thereof, said sticky rubber composition including phosphoric acid.

2. An inner tube comprising an annular tubular structure of elastic rubber composition, and a layer of non-elastic, sticky rubber composition on the interior wall thereof, said sticky rubber composition including an anti-vulcanizing chemical agent causing a permanent softening of the rubber when subjected to heat.

3. An inner tube comprising an annular tubular structure of elastic rubber composition, and a circumferential coating of non-elastic, sticky composition on the interior thereof, said sticky composition comprising rubber that has been subjected to heat in the presence of a vulcanization retarder.

4. An inner tube comprising an annular tubular structure of elastic rubber composition, a layer of rubber composition on the interior wall thereof, which composition is permanently soft and sticky, and a thin, non-tacky non-elastic plastic film covering said sticky layer so that the inner surface of the latter is free to adhere to a puncturing instrument for sealing a puncture in said tube as said instrument is withdrawn therefrom.

RAYMOND S. TAYLOR.
PHILIP M. TORRANCE.
ROBERT H. ANDERSON.